US011503412B2

(12) United States Patent
Dektor et al.

(10) Patent No.: US 11,503,412 B2
(45) Date of Patent: Nov. 15, 2022

(54) ACOUSTIC SENSOR AND ELECTRICAL CIRCUITS THEREFOR

(71) Applicant: Knowles Electronics, LLC, Itasca, IL (US)

(72) Inventors: Shandor Dektor, Sunnyvale, CA (US); Stephen Cradock, San Francisco, CA (US); Michael Pedersen, Long Grove, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 17/079,331

(22) Filed: Oct. 23, 2020

(65) Prior Publication Data

US 2022/0132251 A1 Apr. 28, 2022

(51) Int. Cl.

| | |
|---|---|
| *H04R 1/08* | (2006.01) |
| *H04R 9/08* | (2006.01) |
| *H04R 11/04* | (2006.01) |
| *H04R 19/04* | (2006.01) |
| *G01H 11/06* | (2006.01) |
| *H04R 1/04* | (2006.01) |
| *H04R 3/00* | (2006.01) |

(52) U.S. Cl.
CPC ............. *H04R 19/04* (2013.01); *G01H 11/06* (2013.01); *H04R 1/04* (2013.01); *H04R 1/08* (2013.01); *H04R 3/00* (2013.01); *H04R 2201/003* (2013.01)

(58) Field of Classification Search
CPC . H04R 1/08; H04R 9/08; H04R 11/04; H04R 17/02; H04R 21/02

USPC .......................................... 381/335, 355, 369
See application file for complete search history.

(56) References Cited

U.S. PATENT DOCUMENTS

| | | | |
|---|---|---|---|
| 9,955,244 B2 * | 4/2018 | Rothkopf ............... | G04G 21/02 |
| 10,149,031 B2 | 12/2018 | Chandrasekaran | |
| 10,405,078 B2 | 3/2019 | Chandrasekaran | |
| 10,349,184 B2 | 7/2019 | Kuntzman | |
| 11,295,855 B2 * | 4/2022 | Pal ........................ | A61B 5/0002 |

(Continued)

FOREIGN PATENT DOCUMENTS

| | | |
|---|---|---|
| WO | 2018081278 | 3/2017 |
| WO | 2018022508 | 2/2018 |
| WO | 2019136032 | 7/2019 |

OTHER PUBLICATIONS

Lillelund, U.S. Appl. No. 16/920,382, U.S. Patent and Trademark Office, filed Jul. 2, 2020.

(Continued)

*Primary Examiner* — Suhan Ni
(74) *Attorney, Agent, or Firm* — Loppnow & Chapa; Matthew C. Loppnow

(57) ABSTRACT

An acoustic sensor assembly that produces an electrical signal representative of an acoustic signal, includes an acoustic transduction element disposed in a housing and acoustically, a heat source causing air pressure variations within the housing when energized, and an electrical circuit electrically coupled to the acoustic transduction element and to contacts on an external-device interface of the housing, wherein the electrical circuit is configured to energize the heat source and determine a non-acoustic condition or change therein based on an amplitude of air pressure variations detected by the acoustic transduction element.

21 Claims, 6 Drawing Sheets

(56) References Cited

U.S. PATENT DOCUMENTS

| | | | |
|---|---|---|---|
| 11,349,191 B1* | 5/2022 | Napoles | H01Q 1/273 |
| 2004/0037437 A1* | 2/2004 | Symons | H04R 3/005 |
| | | | 381/92 |
| 2004/0085258 A1* | 5/2004 | Piccionelli | A47G 33/0809 |
| | | | 345/2.1 |
| 2014/0254837 A1 | 9/2014 | Mortensen | |
| 2015/0362362 A1 | 12/2015 | Pan | |
| 2017/0046117 A1 | 2/2017 | Raghuvir | |
| 2017/0230750 A1 | 8/2017 | Pawlowski | |
| 2019/0194013 A1 | 6/2019 | Chandrasekaran | |

OTHER PUBLICATIONS

Bensa, International Search Report, International application No. PCT/US2018/067562, European Patent Office, Rijswijk, NL, dated Feb. 21, 2019.

* cited by examiner

ACOUSTIC SENSOR AND ELECTRICAL CIRCUITS THEREFOR

TECHNICAL FIELD

The disclosure relates generally to acoustic sensors assemblies, for example, MEMS microphones, capable of detecting non-acoustic conditions and electrical circuits for such sensor assemblies.

BACKGROUND

Microelectromechanical systems (MEMS) microphones have been widely adopted for use in mobile communication devices, smart speaker, hearing aids, true wireless stereo (TWS) earphones among a variety of other host devices for their low power consumption, low cost, small size, high sensitivity or other desirable characteristics. There is also latent or developing demand for ancillary applications enabled by data from non-acoustic sensors. Such non-acoustic sensors include gas and air pressure sensors, among others. Air pressure sensors can be used for barometric and altimeter applications. Gas sensors, like $CO_2$ sensors, can be used indicate vehicle and indoor air quality and can be used to monitor occupancy of enclosed spaces, among other applications. Monitoring the concentration or changes therein of other gases may also be desirable. Various gases can be detected using thermal-conductivity based sensors or optical absorption sensors. But these and other single-purpose, or dedicated, non-acoustic sensors are relatively costly or bulky and may consume substantial power.

The objects, features and advantages of the present disclosure will become more fully apparent to those of ordinary skill in the art upon careful consideration of the following Detailed Description and the appended claims in conjunction with the accompanying drawings described below.

DETAILED DESCRIPTION

Figure 1:
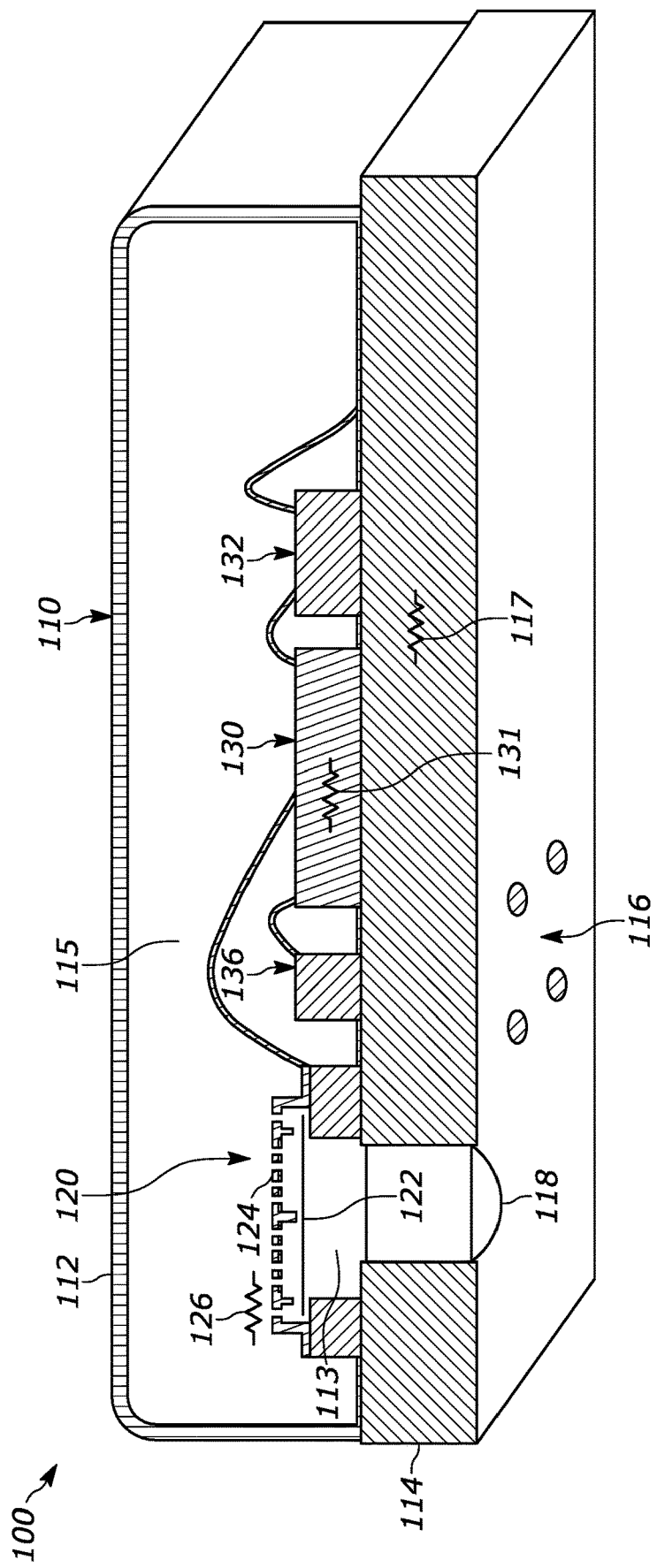
FIG. 1 is a sectional view of a generic acoustic sensor assembly that detects non-acoustic conditions.

The present disclosure relates generally to acoustic sensor assemblies and electrical circuits for sensors capable of detecting non-acoustic conditions or changes thereof. FIG. 1 is an acoustic sensor assembly 100 that detects both acoustic and non-acoustic conditions and produces an electrical signal representative of the detected conditions at an analog or digital external-device interface of the acoustic sensor assembly. The non-acoustic conditions can be, among others, ambient air pressure or a concentration of a gas, like carbon dioxide, methane among other gasses having properties different than air, as described herein.

The acoustic sensor assembly generally comprises an acoustic transduction element and an electrical circuit disposed in a housing. The transduction element can be a capacitive, piezoelectric or other known or future transduction element fabricated as a microelectromechanical systems (MEMS) or other known or future device. The electrical circuit can take the form of one or more integrated circuits or ASICs, examples of which are described herein.

In FIG. 1, the housing 110 comprises a cover or lid 112 fastened to a base 114 having multiple contacts (a few of which are shown schematically) on an external-device interface 116. The cover or lid can be a unitary member formed of a metal, a metallized non-conductive material, like plastic, or an assembly fabricated from FR4, among other materials. Some covers can include embedded conductors or components depending on the configuration of the sensor. The base can also be FR4 and can include embedded conductors and components, e.g., circuit elements for filtering. The external-device interface can be a surface-mount interface integratable with a host device by reflow soldering. Alternatively, the external-device interface can be some other known or future interface structure, like through-hole leads, mountable to the host by wave soldering or other known or future affixation processes.

The housing also comprises a port acoustically coupling the acoustic transduction element located within the housing to an exterior thereof. The port can be disposed through the base, lid or side wall and the transduction element can be located over the port as is known generally by those having ordinary skill in the art. In FIG. 1, a sound port 118 is disposed through the base 114 and a transduction element 120 is mounted on the base adjacent to or over the port. The port 118 is shown as an opening, but it may be covered by an ingress barrier or constitute a portion of an enclosed housing through which sound can propagate and be detected by the acoustic transduction element. In other assemblies, the transduction element is mounted over a port in the lid or sidewall. In some implementations, the acoustic transduction element defines at least a portion of an interface between front and back volumes of the housing. In FIG. 1, the transduction element is a capacitive MEMS die having a diaphragm 122 and back plate 124 that form a portion of an interface between a front volume 113 of the housing and back volume 115 thereof. Other types of transduction elements can similarly define at least a portion of a boundary between the front and back volumes of the housing.

In FIG. 1, an electrical circuit 130 disposed in the housing is electrically coupled to an output of the transduction element and to contacts (a few of which are shown schematically) on the external-device interface 116 via conductors (not shown) extending through or embedded in the base. The electrical circuit generally conditions and processes an electrical signal produced by the transduction element in response to detecting acoustic and non-acoustic conditions as described herein. The electrical circuit can include a buffer-amplifier or charge sampling circuit coupled to the output of the transduction element, a filter, biasing circuitry, an analog-to-digital circuit or sigma-delta modulator, and a protocol interface circuit among other circuit elements, depending on the use case. The electrical circuit may also include a charge pump for some types of transduction elements, like capacitive MEMS dies. Other transduction elements do not require a charge pump or a bias circuit. In FIG. 1, the electrical circuit comprises an integrated circuit 130 and an optional processing circuit 132, like a DSP, for detecting gas concentrations and air pressure and for performing keyword detection, authentication among other higher order functions performed by some microphone assemblies. The electrical circuit and optional processor are electrically coupled to the transduction element and to the external device interface as is known generally by those having ordinary skill in the art.

According to one aspect of the disclosure, the sensor assembly includes a heat source that creates air pressure variations within the housing when energized. The heat source can be located in the back volume or elsewhere in or on the sensor assembly where the heat source will generate air pressure variations detectable by the transduction element as described herein. In implementations where the acoustic transduction element defines an interface between front and back volumes of the housing, the air pressure variation is formed across the transduction element. Other configurations of the transduction element and heat source are also possible, provided that the transduction element is capable of detecting air pressure variations within the housing attributable to the heat source.

In operation, generally, the heat source generates air pressure variations within the housing and the transduction element detects and produces an output signal that is representative of the detected pressure variations. The amount of pressure generated by the heat source depends on its heat transfer properties, electrical power, and the thermo-viscous properties of the gas in the back volume of the housing.

Figure 2:
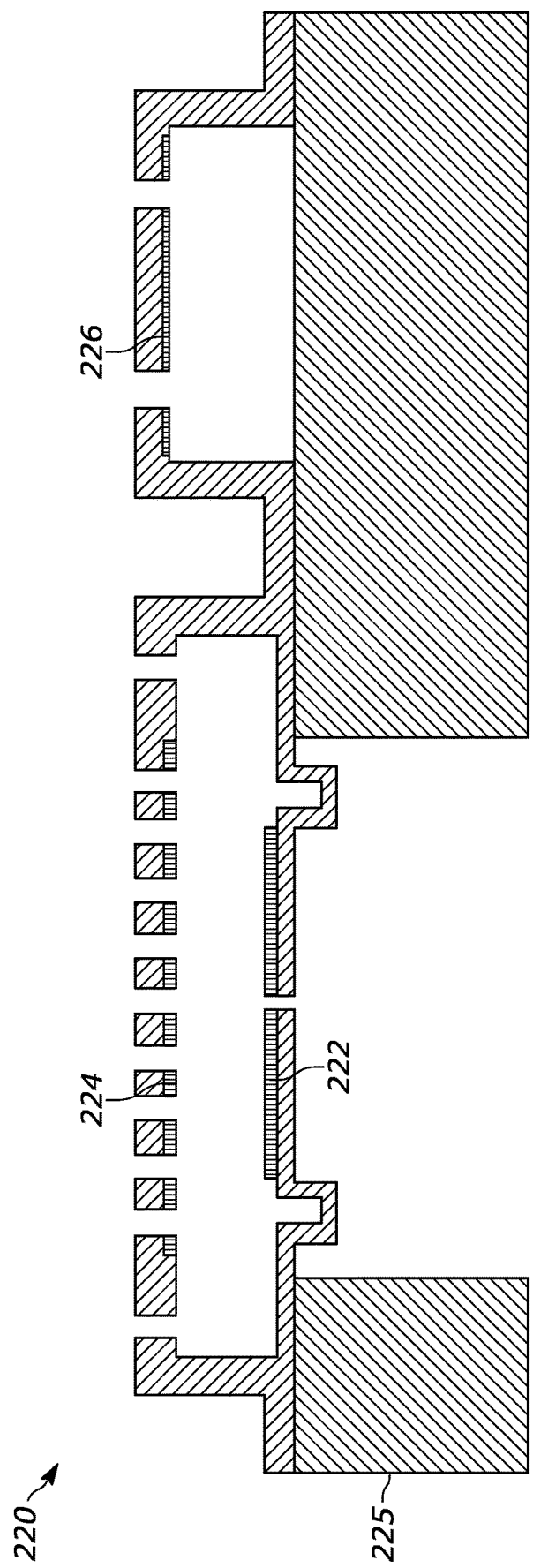
FIG. 2 is a sectional view of a transduction element having an integrated heat source.

In one implementation, the heat source is a resistive element integrated with the audio sensor assembly. In FIG. 1, a resistive element 126, shown schematically, is integrated with a MEMS die 120. In other implementations however the heat source can be integrated with other types of transduction elements. FIG. 2 is a more particular implementation of a capacitive MEMS die 220 comprising a diaphragm 222 and a back plate 224 coupled to a substrate 225, wherein the die also includes an integrated resistive element 226. Integrating the resistive element with the MEMS die efficiently transfers heat to the interior of the housing where the resulting air pressure variations are detectable by the transduction element. Alternatively, the heat source may be a resistive element embedded in a portion of the housing, like the base or lid. FIG. 1 shows a resistor 117 embedded in the base 114 for this purpose. The heat source can also be a resistor 131 embedded in the integrated circuit 130. More generally, the heat source can be any one or more of these or other heat sources integrated with the sensor assembly.

In another implementation, the heat source is provided by an electrical circuit disposed within the housing. In FIG. 1, for example, the processor 132 functions as the heat source and a duty cycle of the processor corresponds to the operating frequency of the heat source. In this implementation, the acoustic transduction element detects pressure variations produced by the processor within the housing, and the electrical circuit determines the non-acoustic condition or change thereof based on an averaged amplitude of the pressure variation. At the same time, the acoustic transduction element detects voice and more generally sound and produces a corresponding output signal at the external-device interface.

The electrical circuit can determine a non-acoustic condition or a change thereof based on an amplitude of the air pressure variations detected by the transduction element. The electrical circuit can also provide one or more output signals corresponding to the acoustic and non-acoustic conditions at the external-device interface of the sensor assembly. In some implementations, the electrical circuit is electrically coupled to the heat source (e.g., a resistor or resistive element) and energizes the heat source when a measurement of a non-acoustic condition is desired (e.g., when requested by an application). The heat source can be energized at an operating frequency (i.e., cycled or modulated) and the electrical circuit can average the amplitude of the air pressure variation over time to provide a time-averaged signal representative of the non-acoustic condition. The heat source can be cycled by a harmonic/sinusoidal, square wave or other signal or code having the desired periodicity. Power consumption associated with the measurement of the non-acoustic condition can be managed by selectively energizing the heat source, the duty cycle thereof, or both only when measurement data is required. In some implementations, the heat source is energized at a frequency below a low frequency cutoff of the acoustic sensor assembly. For example, the heat source can be energized at a frequency below the audio band or at an amplitude that will not create audible artifacts detectable by, or objectionable to, a user. Modulating the heat source at frequencies below the low frequency cutoff will reduce the gain of such modulation frequencies received by the electrical circuit and output by the sensor assembly. For modulation frequencies within the audio band, audible artifacts can be reduced by appropriate selection of a modulation scheme such as an NPR/MLS (maximum length sequence) code. Such code generation can be performed by a DSP. The acoustic and non-acoustic output signals of the sensor assembly can be multiplexed on common data output pins or contacts or the signals can be provided on dedicated outputs contacts.

In some implementations, the electrical circuit comprises a heat source signal generator coupled to the heat source wherein the heat source is energized by the heat source signal generator at some frequency as described herein. A multiplier or correlator is coupled to the output of the acoustic transduction element and to a reference signal having the same frequency as the heat source generator. The time duration of the multiplier or correlator can be increased to increase the SNR of the measurement. The reference signal can be obtained from the heat source signal generator or a separate source (e.g., an oscillator) having the same frequency as the heat source signal generator. The amplitude of the air pressure variation induced by the heat source is based on (e.g., proportional to) the output of the multiplier or correlator, for example after integration or filtering. In other implementations, the heat source is a processor, e.g., a DSP, that operates at a known frequency like the frame rate and the reference signal has the same frequency as the processor. This functionality can be implemented as hardware or software (e.g., by a DSP) or a combination thereof.

Figure 3:
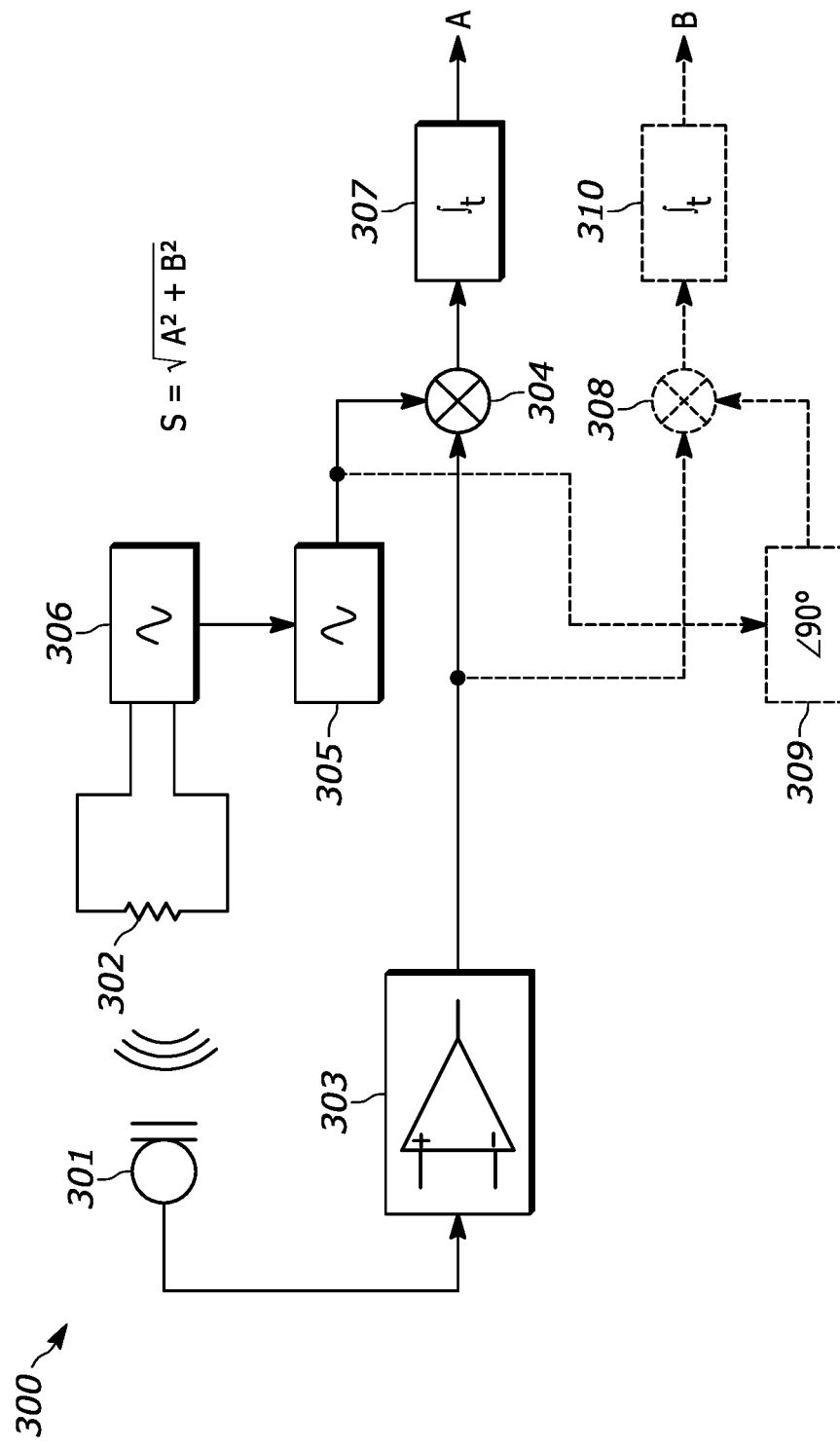
FIG. 3 is a circuit for detecting gas or pressure.

In FIG. 3, a detection circuit 300 suitable for gas or ambient pressure sensing can be based on quadrature detection. In such a circuit, the signal from a transduction element 301 due to the heat source 302 induced pressure variation is amplified in block 303 and multiplied at a multiplier circuit 304 with a signal (e.g., a sine wave) generated in block 305 of identical frequency to the heat source drive signal from block 306 to the heat source, and subsequently integrated over time by an integrator 307. The amplifier circuit 303 can be part of the conditioning circuit. Alternatively, the amplified pressure variation signal can be multiplied with the same signal 306 that drives the heat source, thereby eliminating the need for circuit block 305. The resulting signal "A" contains only contributions at the particular frequency of interest, which in turn results in very high SNR and noise discrimination. To increase the sensitivity of the circuit, an optional second multiplication of the transducer signal in block 308 can be done with a signal (e.g., a sine wave) of identical frequency to the drive signal to the heat source, but shifted 90 degrees out of phase in block 309. Upon integration in block 310, if signal B is added to the first signal A, the full amplitude can be recovered irrespective of phase. Complex spectrum can be used as observation for improved accuracy (S=A+jB). The output of the detection circuit can be calibrated to more accurately relate it to the non-acoustic condition (e.g., pressure, gas, etc.) of interest. The circuit of FIG. 3 can be implemented as hardware or software (e.g., by a DSP) or a combination thereof.

Figure 4:
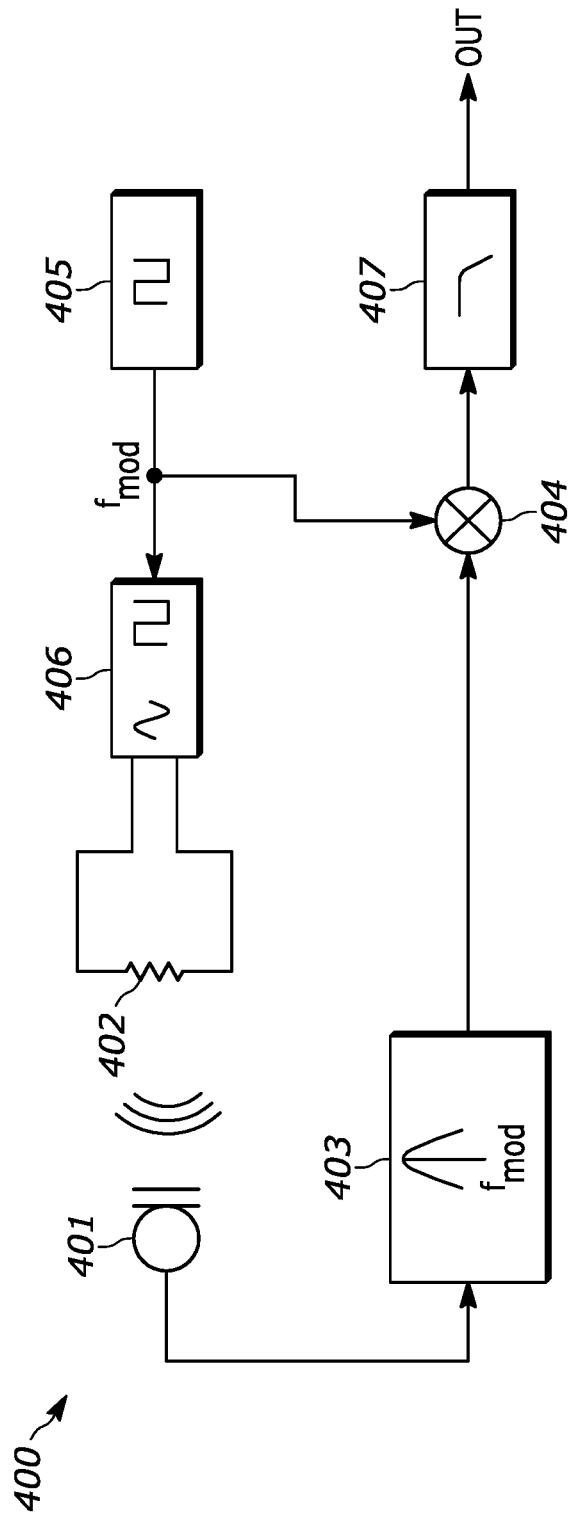
FIG. 4 is an alternative circuit for detecting gas or pressure.

In FIG. 4, an alternative detection circuit 400 suitable for gas or ambient pressure sensing can be based on synchronized demodulation. In such a circuit the heat source 402 is driven at a selected operating frequency $f_{mod}$. The drive signal may be generated by an oscillator 405 and filtered to eliminate higher harmonics in filter 406. The signal from transduction element 401 in response to the heat source induced pressure variation is filtered by band pass filter 403 having a center frequency equal to the operating frequency $f_{mod}$ of the heat source, correlated with the heat source drive reference signal in block 404, and filtered by low pass filter 407. The bandpass filter circuit 403 can be part of the conditioning circuit. The resulting signal contains only contributions at the frequency $f_{mod}$, which results in very high SNR and noise discrimination. Coupling the clock source to the correlator maximizes SNR and use of the sampling clock ensures no timing misadjustment. If the clock is separate, a harmonic tracker/PLL can be used to track the oscillation and subtract it from the sensor signal. Here too, the output of the detection circuit can be calibrated to more accurately relate it to the non-acoustic condition of interest. The circuit of FIG. 4 can be implemented as hardware or software (e.g., by a DSP) or a combination thereof.

In one implementation, the electrical circuit is configured to determine the non-acoustic condition or change thereof based on information other than the air pressure amplitude alone or in combination with the amplitude of the air pressure variation within the housing. Such other information includes temperature and humidity among other information. The use of such information may be used to improve the accuracy of some non-acoustic (e.g., gas and pressure) measurements and to measure other non-acoustic conditions that cannot be determined or measured accurately based on air pressure amplitude measurements alone. For example, ambient temperature information can improve the accuracy of gas and pressure measurements. Ambient humidity information may further improve the accuracy of such measurements. Temperature and humidity information can be obtained from one or more dedicated sensors integrated with the acoustic sensor assembly. A temperature sensor can be cost effectively integrated with the sensor assembly with minimal space requirements, either by integration with the ASIC or as a standalone sensor in the housing. A humidity sensor and among others can be integrated similarly. For example, humidity can be detected by a small polyamide dielectric capacitor integrated with the ASIC or with some other portion of the sensor assembly. In FIG. 1, an environmental sensor 136 is representative of one or more sensors integrated with the acoustic sensor assembly and electrically coupled to the electrical circuit for this purpose. Alternatively, the environmental information other than air pressure amplitude can be obtained from an external source like the host device via the external-device interface of the acoustic sensor assembly.

Figure 5:
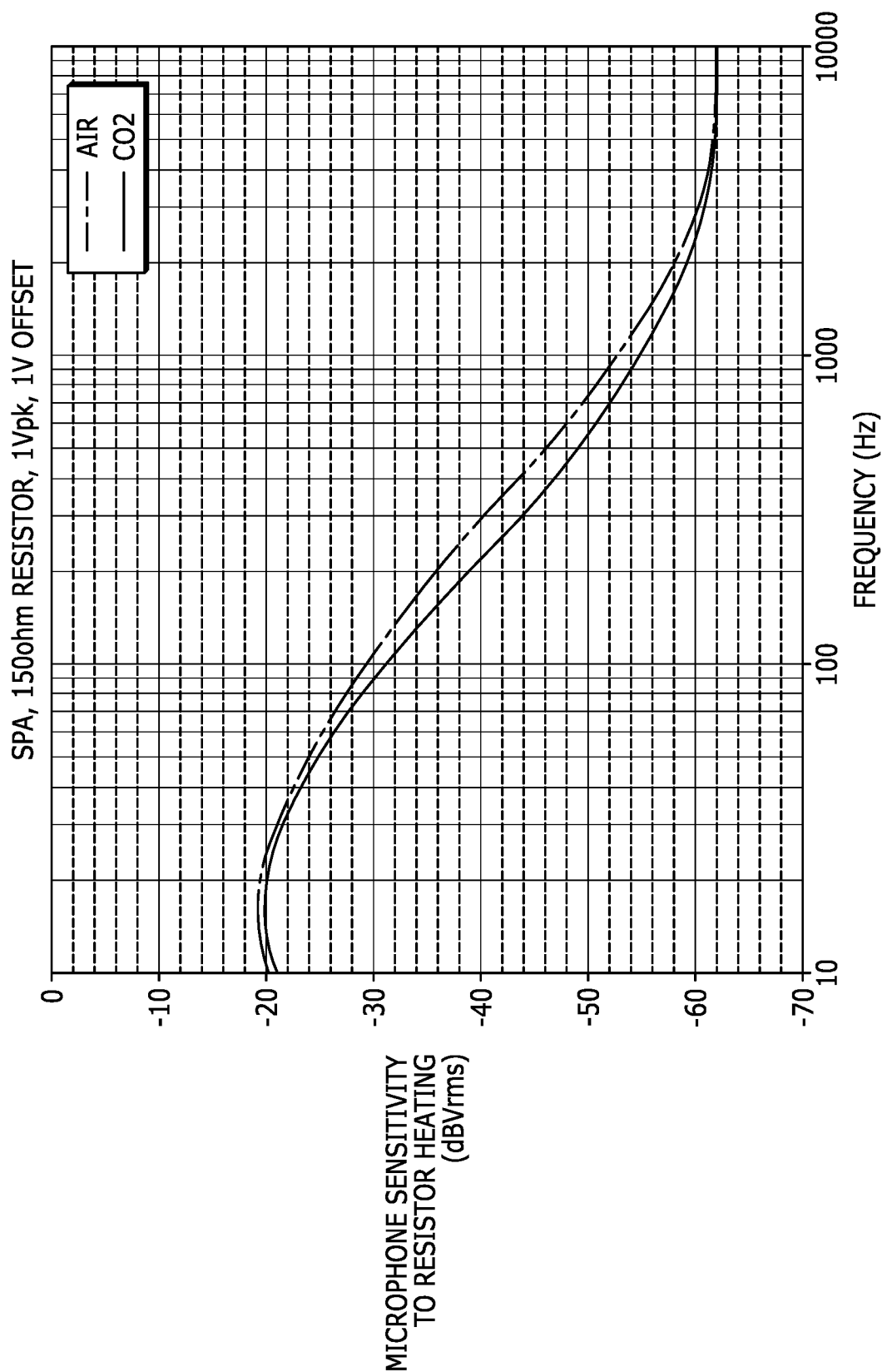
FIG. 5 is a plot of microphone sensitivity to heat source induced pressure variations versus frequency for air and $CO_2$.
Figure 6:
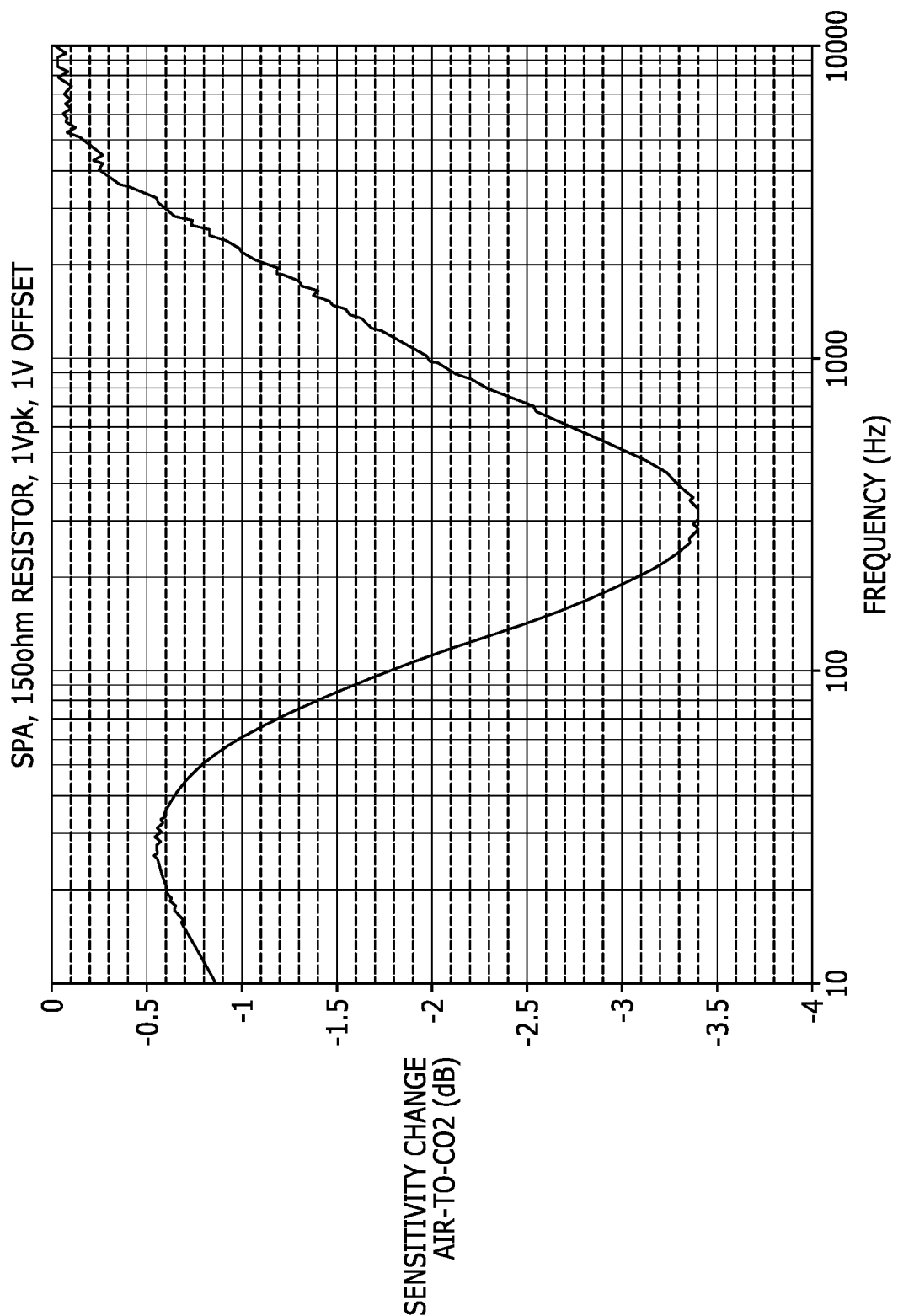
FIG. 6 is a plot of the change in microphone sensitivity to heat source induced pressure variations from air to CO2 versus frequency.

In one application, the electrical circuit energizes the heat source at an operational frequency suitable for determining a $CO_2$ concentration or change thereof. FIG. 5 illustrates the sensitivity (dB Vrms) versus frequency of an acoustic sensor comprising a capacitive MEMS die in the presence of Air and $CO_2$. FIG. 6 illustrates the relative difference of microphone response to the heat source induced pressure variation as a function of frequency. For the specific design shown in FIG. 6, the largest response to $CO_2$ content is at a frequency of approximately 300 Hz. More generally however the optimum $CO_2$ detection frequency depends on the size of the volume, thermal properties of the heat source, and the heat coupling efficiency between the heat source and the gas, among other application specific factors.

Since thermal conductivity, heat capacity, and viscosity of $CO_2$ is different from that of air, any mixture of the two will have different acoustic propagation properties, resulting in a change in the observed heat source induced pressure variation. As suggested, other influences on the heat source induced pressure variation, including ambient pressure, temperature and humidity, may be required to most accurately detect $CO_2$ at low concentrations or under certain environmental conditions. For instance, a temperature change of 1 K is equivalent to a $CO_2$ change of 2100 ppm, a 10% change in humidity is equivalent to a $CO_2$ change of 1400 ppm, and an ambient pressure change of 1 hPa is equivalent to a $CO_2$ change of 1700 ppm. The optimum duty cycle of the heat source for $CO_2$ detection depends on desired precision (integration time) and update rate of the system. In general, update rates of once every 1-10 seconds would be considered adequate. Depending on required precision, the duty cycle of the heat source may be between 10%-100%.

In another application, the electrical circuit energizes the heat source at an operational frequency suitable for determining pressure or change thereof. The pressure internal to the sensor housing is related to temperature via the ideal gas law $$PV = mR_{sp}T \tag{1}$$

Expression (1) can be rewritten as $$P = \rho R_{sp}T \tag{2}$$

where P is pressure, V is volume, m is the mass of the gas in volume V (or use air density $\rho=n/V$), Rsp is specific gas constant, and T is temperature. The ideal gas law is valid as long as the volume remains fixed and air is not freely flowing to outside the housing. The expression can be linearized around the steady state operating temperature as $\Delta P = \rho R_{sp}\Delta T$, where $\Delta P$ is the change in pressure, $\rho$ is air density, and $\Delta T$ is the temperature change. An estimated density can be expressed as $$\rho_{est} = \frac{\Delta P_{meas}}{R_{sp}\Delta T_{cal}} \tag{3}$$

where pressure is measured by the transduction element, the $R_{sp}$ and $\Delta T$ can be obtained from a data sheet and calibration, respectively. The measured change in pressure is a measurement of the product of the density ($\rho$) and the specific heat capacity. This simplified model assumes that the input $\Delta T$ is known and that this is a pure tone input (with fixed amplitude in temperature) above the LFRO and so there is not enough time for the pressure to equalize via the pierce. For this case the amplitude of the measured pressure signal is given by the linearized form of equation (2). In general however this will largely be a function of a-priori calibration, given discrepancies in sensor gains, heat sources, etc.

Pressure is related to density and altitude by the following expression $$\rho = \rho_0 \left(1 - \frac{Lh}{T}\right)^{\frac{gM}{R_{sp}L}} \quad (4)$$

where h is the height and the other parameters relate to ground temperature T, scale height L, the molar mass of air M and the specific gas constant $R_{sp}$. Expression (4) can be linearized around sea level (h=0) as follows $$\rho \sim \rho_0 \left(1 - \frac{h}{h_0}\right) \quad (5)$$

where $h_0$ is inverse slope of the density change versus height, approximately 7500 meters. Thus an accuracy of 1 percent in measuring local air density will result in an altimeter accuracy of approximately 75 meters. If the temperature excursion $\Delta T$ is not known, it is possible by calibration to measure the ambient pressure and the altitude using the following expression $$h = 145366.45 \left[\frac{P_{meas}}{1013.25}\right]^{0.190284} \quad (6)$$

where $P_{meas}$ is the measured ambient pressure in hPa.

While the present disclosure and what is presently considered to be the best mode thereof has been described in a manner establishing possession by the inventors and enabling those of ordinary skill in the art to make and use the same, it will be understood and appreciated that equivalents of the exemplary embodiments disclosed herein exist, and that myriad modifications and variations may be made thereto, within the scope and spirit of the disclosure, which is to be limited not by the exemplary embodiments described but by the appended claims.

What is claimed is:

1. An acoustic sensor assembly that produces an electrical signal representative of an acoustic signal corresponding to acoustic and non-acoustic conditions detected by an acoustic transduction element, the acoustic sensor assembly comprising:
    a housing having a sound port and an external-device interface;
    the acoustic transduction element disposed in the housing and acoustically coupled to the sound port;
    a heat source disposed in the housing and energizable to cause air pressure variations within the housing;
    an electrical circuit disposed in the housing and electrically coupled to the acoustic transduction element and to contacts on the external-device interface, the electrical circuit comprising:
        a conditioning circuit having an input coupled to the acoustic transduction element; and
        an interface coupled to contacts of the external-device interface of the housing of the acoustic sensor assembly,
        the electrical circuit configured to
            energize the heat source and
            determine a non-acoustic condition or change therein based on an air pressure variation signal received by the conditioning circuit from the acoustic transduction element in response to detecting air pressure variations within the housing resulting from energization of the heat source.

2. The acoustic sensor assembly of claim 1, wherein the electrical circuit is configured to determine the non-acoustic condition or change therein based on an amplitude of the air pressure variation.

3. The acoustic sensor assembly of claim 2, the electrical circuit comprising a multiplier circuit coupled to the acoustic transduction element by a conditioning circuit, the multiplier circuit configured to multiply an air pressure variation signal from the acoustic transduction element with a reference signal having a frequency corresponding to the operating frequency of the heat source, wherein the amplitude of the air pressure variation is based on an output of the multiplier circuit.

4. The acoustic sensor assembly of claim 3, wherein the electrical circuit is configured to energize the heat source at an operating frequency and average the amplitude of the air pressure variation over a time interval.

5. The acoustic sensor assembly of claim 4 further comprising a processor coupled to the electrical circuit, wherein the processor is the heat source.

6. The acoustic sensor assembly of claim 4, wherein the acoustic transduction element defines at least a portion of an interface between a front volume of the housing and a back volume of the housing, the heat source causing air pressure variation across the transduction element when energized.

7. The acoustic sensor assembly of claim 6, wherein the acoustic transduction element includes a microelectromechanical systems (MEMS) die.

8. The acoustic sensor assembly of claim 7, wherein the heat source is a resistive element integrated with the MEMS die.

9. The acoustic sensor assembly of claim 6, wherein the housing comprises a lid disposed on a base including the external-device interface and the heat source is located in the back volume of the housing.

10. The acoustic sensor assembly of claim 3, wherein the electrical circuit is configured to determine the non-acoustic condition or change therein based on an amplitude of the air pressure variation within the housing and based on an environmental condition.

11. The acoustic sensor assembly of claim 10, wherein the non-acoustic condition is ambient air pressure.

12. The acoustic sensor assembly of claim 10, wherein the non-acoustic condition is a concentration of a gas having properties different than air.

13. An electrical circuit for an acoustic sensor assembly that produces an output signal representative of acoustic and non-acoustic conditions detected by an acoustic transduction element disposed in a housing of the acoustic sensor assembly, the electrical circuit comprising:
    a conditioning circuit having an input connectable to the acoustic transduction element;
    an interface connectable to contacts of an external-device interface of the housing of the acoustic sensor assembly,
    the electrical circuit configured to:
        energize a heat source disposed in the housing of the acoustic sensor assembly; and
        determine a non-acoustic condition or change therein based on an air pressure variation signal received by the conditioning circuit from the acoustic transduction element in response to detecting air pressure variations within the housing resulting from energization of the heat source.

14. The electrical circuit of claim 13 is configured to determine the non-acoustic condition or change therein based on an amplitude of the air pressure variation.

15. The electrical circuit of claim 14 is configured to energize the heat source at an operating frequency and average the amplitude of the air pressure variation over a time interval, wherein the conditioning circuit includes a band pass filter having a center frequency equal to the operating frequency, and a correlator configured to correlate the air pressure variation signal after filtering by the band pass filter and the reference signal.

16. The electrical circuit of claim 13 further comprising a first multiplier circuit coupled to the conditioning circuit and configured to multiple the air pressure variation signal after conditioning, and a reference signal having a frequency corresponding to an operating frequency of the heat source, wherein the amplitude of the air pressure variation is based on an output of the first multiplier circuit.

17. The electrical circuit of claim 16 is configured to energize the heat source at an operating frequency and average the amplitude of the air pressure variation over a time interval.

18. The electrical circuit of claim 17 is configured to energize the heat source at a frequency below a low frequency cutoff of the acoustic sensor assembly.

19. The electrical circuit of claim 17 further comprising a processor, wherein the processor is the heat source.

20. The electrical circuit of claim 16 further comprising a first integrator coupled to the first multiplier circuit, wherein the amplitude of the air pressure variation is based on an output of the first integrator.

21. The electrical circuit of claim 16 further comprising a second multiplier circuit coupled to the conditioning circuit and to a 90 degree phase shifter, the second multiplier circuit configured to multiple the air pressure variation signal after conditioning and the reference signal, wherein the amplitude of the air pressure variation is based on an output of the first multiplier circuit and the second multiplier circuit.

* * * * *